United States Patent [19]

Guazzo

[11] 4,412,878

[45] Nov. 1, 1983

[54] METHOD OF JOINING TOGETHER OPTICAL FIBRE UNDERSEA CABLES

[75] Inventor: Lucien Guazzo, Calais, France

[73] Assignee: Societe Anonyme dite: Les Cables de Lyon, France

[21] Appl. No.: 366,020

[22] Filed: Apr. 6, 1982

[30] Foreign Application Priority Data

Apr. 8, 1981 [FR] France .................. 81 07057

[51] Int. Cl.³ .................. B32B 7/04; G02B 5/14
[52] U.S. Cl. .................. 156/91; 29/433; 29/526 R; 156/158; 156/304.2; 350/96.15; 350/96.21
[58] Field of Search .................. 156/49, 91, 158, 169, 156/304.2; 29/433, 526 R; 350/96.15, 96.21

[56] References Cited

U.S. PATENT DOCUMENTS

| | | | |
|---|---|---|---|
| 3,798,099 | 3/1974 | Marcatili | 156/304.2 |
| 4,148,557 | 4/1979 | Garvey | 350/96.2 |
| 4,171,867 | 10/1979 | Cocito | 350/96.21 |
| 4,172,746 | 10/1979 | Le Noane | 156/158 |
| 4,283,125 | 8/1981 | Borsuk | 350/96.2 |
| 4,319,802 | 3/1982 | Bowes | 350/96.2 |
| 4,362,356 | 12/1982 | Williams et al. | 350/96.2 |

FOREIGN PATENT DOCUMENTS

| | | | |
|---|---|---|---|
| 3006131 | 9/1981 | Fed. Rep. of Germany | 350/96.2 |
| 3011429 | 10/1981 | Fed. Rep. of Germany | 350/96.2 |
| 3129828 | 4/1982 | Fed. Rep. of Germany | 350/96.2 |
| 2401434 | 5/1977 | France . | |
| 2435051 | 3/1980 | France . | |
| 54-127508 | 3/1979 | Japan | 350/96.2 |
| 55-84905 | 6/1980 | Japan | 350/96.2 |
| 2025650 | 1/1980 | United Kingdom | 350/96.2 |

*Primary Examiner*—Jerome W. Massie
*Attorney, Agent, or Firm*—Sughrue, Mion, Zinn, Macpeak & Seas

[57] ABSTRACT

A method of joining together optical fibre undersea cables. In a first step, a given length of a carrier vault (1, 2) which surrounds the optical-fibre containing core (3, 4) of the cable end is cut off so as to clear a sufficient length of optical fibre (5, 6), a part (9, 10) with at least one opening (11, 12) in which said optical fibre (5, 6) is inserted is placed in each said cable ends between the strands of the carrier vault, the ends of said carrier vaults (1, 2) are brought together and fixed substantially in contact each with another, said optical fibre ends (5, 6) of each of said cables are connected together then the excess length of fibre thus formed is stretched and helically wound around a sleeve (14).

5 Claims, 1 Drawing Figure

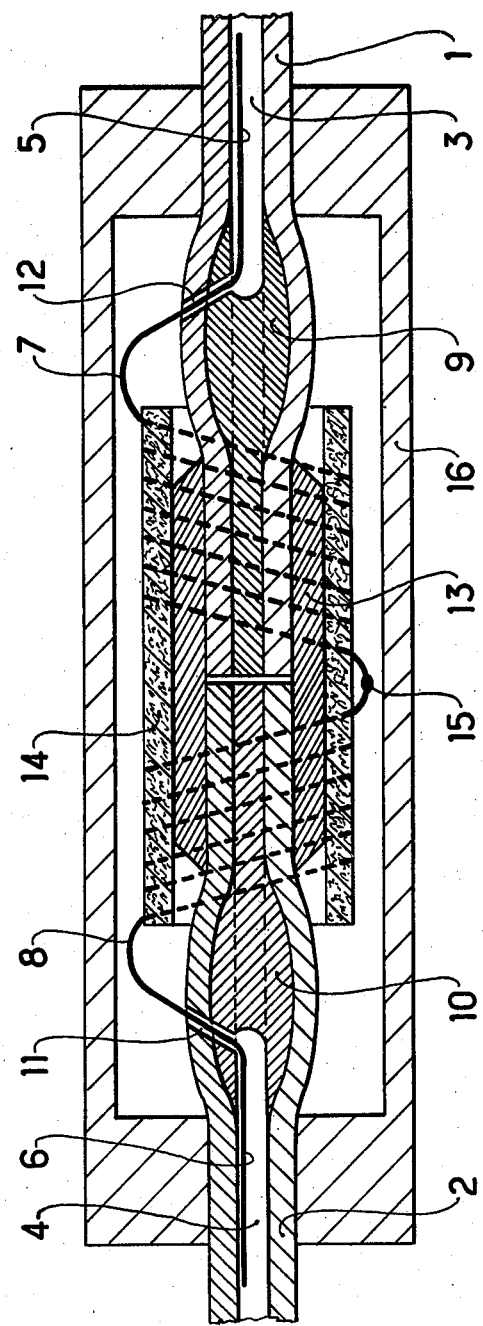

METHOD OF JOINING TOGETHER OPTICAL FIBRE UNDERSEA CABLES

The present invention relates to a method of connecting optical fibre undersea cables together.

BACKGROUND OF THE INVENTION

The main components of undersea cables are a core which contains at least one optical fibre and which is surrounded by a network of wires referred to as a carrier vault which provides mechanical strength to the assembly. These cables are submerged, sometimes to great depths, and are therefore subject to high hydrostatic pressures.

Sometimes, therefore, a cable may break and it is therefore necessary to be able to connect the two lengths together again so as to re-establish continuity of the assembly. It may also be necessary to connect two cables together. Known methods do not allow such connection to be performed sufficiently reliably. Preferred implementation of the present invention provide a practical method of connecting together optical fibre undersea cables which may be submerged to great depths.

SUMMARY OF THE INVENTION

The invention provides a method of joining together two lengths of optical fibre undersea cable, each of which has a core in which at least one optical fibre is disposed, said core being surrounded by a carrier vault formed by metal strands, wherein in said method, in a first step, a given length of said carrier vault is cut off each of the cable ends so as to free suitable lengths of said optical fibres, a part with at least one opening in which said optical fibre is inserted is placed in each of said cable ends between the strands of the carrier vault, the ends of said carrier vaults are brought together and are fixed substantially in contact each with another, the ends of the optical fibres from each of said cable ends are tensioned, said fibres are interconnected, and then the excess length of fibres is helically wound around a sleeve.

BRIEF DESCRIPTION OF THE DRAWING

One implementation of the invention is described by way of example with reference to the accompanying drawing, in which the sole FIGURE is a diagrammatic cross-section through a connection between optical fibre cable ends.

MORE DETAILED DESCRIPTION

In the accompanying drawing, reference 1 designates metal strands of the carrier vault of one of the cables or lengths of cable to be connected together, while reference 2 designates the corresponding strands of the other length of cable.

References 3 and 4 designate the respective cores of said lengths of cable in which optical fibres 5 and 6 respectively are disposed. The FIGURE shows only one fibre by way of non-limiting example.

With a view to connecting together the two lengths of cable, a length of the carrier vaults on said lengths is previously cut so as to leave free a length of optical fibre, namely 7 and 8. Parts referred to as "olives" and referenced 9 and 10 are then each inserted in respective ends of the carrier vaults 1 or 2 and between the strands of said vaults. Each "olive" has a side opening or "chimney" 11, 12 through which the optical fibres pass.

Then, the two lengths 1 and 2 of vault are brought into contact with each other and they are clamped together by means of a first metal sleeve 13. A second sleeve 14 made of a flexible substance such as a foam plastics substance is disposed on the sleeve 13. The optical fibres 7 and 8 are then welded together e.g. at a point 15, and then the excess length of fibre is stretched and is helically wound around said sleeve 14.

The two lengths of cable are thus joined together and a protective housing 16 is placed around the connection so as to suitably withstand hydrostatic pressure when the cable is again submerged in the sea.

The invention is used to repair undersea cables and also to interconnect two different cables.

One variant of the invention would be to glue the fibres end to end by means of strip plates with alignment V's.

What is claimed is:

1. A method of joining together two lengths of optical fibre undersea cable, each length having a core in which at least one optical fibre is disposed, said core being surrounded by a carrier vault formed by metal strands, said method comprising the steps of:

cutting off a given length of said carrier vault at each cable end to free suitable lengths of said optical fibres, inserting each optical fibre free length into a part with the free length passing through an opening within the side of said part and positioning said part within the center of the carrier vault inwardly from the end thereof and passing the fibre free length protruding from the opening within the side of said part outwardly between the strands of the carrier vault, bringing the ends of said carrier vaults together and fixing them substantially in contact each with another while placing a first sleeve about the contacting ends of said carrier vaults, interconnecting the free ends of said optical fibres, tensioning the free ends of the optical fibres from each of said cable ends, and then helically winding the excess length of said fibres around said first sleeve.

2. A method according to claim 1, wherein the step of fixing said cable ends together comprises disposing a second, metal sleeve about the ends of said carrier vaults internally of said first sleeve.

3. A method according to claim 2, wherein said first sleeve is disposed around said second, metal sleeve after said metal sleeve is disposed about the ends of said carrier vaults prior to winding said excess length fibres about said first sleeve and wherein said first sleeve is made of a flexible foam plastics substance.

4. A method according to claim 1, further comprising the step of forming a protective housing around the connection.

5. A method according to claim 1, wherein said step of interconnecting the ends of the optical fibres comprises welding said ends.

* * * * *